United States Patent
Wada

(10) Patent No.: US 7,479,991 B2
(45) Date of Patent: Jan. 20, 2009

(54) DIGITAL CAMERA, AND SIGNAL PROCESSING METHOD AND SIGNAL PROCESSING APPARATUS FOR THE SAME

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 639 days.

(21) Appl. No.: 11/265,267

(22) Filed: Nov. 3, 2005

(65) Prior Publication Data

US 2006/0103739 A1 May 18, 2006

(30) Foreign Application Priority Data

Nov. 12, 2004 (JP) ............................ P.2004-328864

(51) Int. Cl.
*H04N 9/73* (2006.01)
(52) U.S. Cl. ...................... 348/223.1; 348/29; 348/256; 348/649; 348/655; 348/657; 382/162; 382/167; 382/254
(58) Field of Classification Search ................... 348/29, 348/30, 223.1, 225.1, 256, 649, 655, 657, 348/703; 382/162, 167, 254, 274
See application file for complete search history.

(56) References Cited

U.S. PATENT DOCUMENTS 5,412,433 A * 5/1995 Holland et al. .............. 348/650
5,563,666 A * 10/1996 Suzuki ........................ 348/645
5,712,683 A * 1/1998 Nakai et al. ................. 348/256
5,729,299 A * 3/1998 Suzuki et al. ................ 348/649
6,028,646 A * 2/2000 Jeong et al. ................. 348/645
6,972,793 B1 * 12/2005 Kameyama ................. 348/256
7,113,207 B2 * 9/2006 Fukui et al. ............... 348/225.1

FOREIGN PATENT DOCUMENTS

JP 2557620 B2 11/1996

* cited by examiner

*Primary Examiner*—Lin Ye
*Assistant Examiner*—Chriss S Yoder, III
(74) *Attorney, Agent, or Firm*—Birch, Stewart, Kolasch & Birch, LLP

(57) ABSTRACT

A signal processing method comprises: applying white balance correction to R (red), G (green), and B (blue) color signals output from a solid-state image pickup element so as to form white-balance corrected R, G, and B color signals; comparing levels of the white-balance corrected R, G, and B color signals with each other; correcting the level of the white-balance corrected G signal to coincide with a lower one of the levels of the white-balance corrected R and B color signals in the case where both of the levels of the white-balance corrected R and B signals are higher than the level of the white-balance corrected G signal when the G color signal is saturated; and outputting the white-balance corrected R, G, and B color signals as image signals.

4 Claims, 5 Drawing Sheets

EXAMPLE OF CORRECTION IN CASE OF B > R > G OR R > B > G

EXAMPLE OF CORRECTION IN CASE OF G > B > R OR G > R > B

DIGITAL CAMERA, AND SIGNAL PROCESSING METHOD AND SIGNAL PROCESSING APPARATUS FOR THE SAME

BACKGROUND OF THE INVENTION

1. Field of the Invention

The present invention relates to a digital camera having a solid-state color image pickup element, and a signal processing method and a signal processing apparatus for it, and more particularly to a digital camera which suppresses generation of a purple false color after taking a white balance, and a signal processing method and a signal processing apparatus for it.

2. Description of the Related Art

In a CCD or CMOS image sensor using primary color filters, usually, the sensitivity for green (G) is higher than the sensitivities for red (R) and blue (B), but the saturation levels for red, green, and blue are substantially equal to each other. When a white balance is taken, however, the red and blue gains are larger than the green gain in order to compensate the sensitivity ratio, with the result that the green saturation level is lower than the red and blue saturation levels.

When the green saturation level is made coincident with the red and blue saturation levels, there arises a problem in that a purple false color is generated in a high brightness region. Conventionally, therefore, the red and blue saturation levels are clipped in accordance with a pixel for detecting green to suppress a purple false color, as described in Japanese Patent No. 2,557,620.

When the red and blue saturation levels are clipped at the green saturation level as described above, generation of a purple false color can be suppressed. However, clipping of the red and blue saturation levels causes another problem that the dynamic ranges of red and blue are reduced.

SUMMARY OF THE INVENTION

It is an object of the invention to provide a digital camera in which a purple false color that may be generated at high brightness in a region where green is saturated can be suppressed without reducing the dynamic ranges of red and blue, and a signal processing method and a signal processing apparatus for it.

The signal processing method of the invention is a signal processing method in which white balance correction is applied to R (red), G (green), and B (blue) color signals output from a solid-state image pickup element, and the signals are then output as image signals, wherein levels of the R, G, and B color signals after the white balance correction are compared with each other, and, in the case where both the R signal level and the B signal level are higher than the G signal level when the G signal is saturated, the G signal level is corrected to coincide with a lower one of the R signal level and the B signal level.

The signal processing apparatus of the invention is a signal processing apparatus white balance correction is applied to R (red), G (green), and B (blue) color signals output from a solid-state image pickup element, and the signals are then output as image signals, wherein levels of the R, G, and B color signals after the white balance correction are compared with each other, and, in the case where both the R signal level and the B signal level are higher than the G signal level when the G signal is saturated, the G signal level is corrected to coincide with a lower one of the R signal level and the B signal level.

The digital camera of the invention comprises: a solid-state image pickup element; a gain correcting section that performs white balance correction on R (red), G (green), and B (blue) color signals output from the solid-state image pickup element; and a signal processing apparatus described above which fetches the R, G, and B color signals that are white balance corrected by the gain correcting section, and which corrects the G signal level.

DETAILED DESCRIPTION OF THE INVENTION

Hereinafter, an embodiment of the invention will be described with reference to the accompanying drawings.

Figure 1:
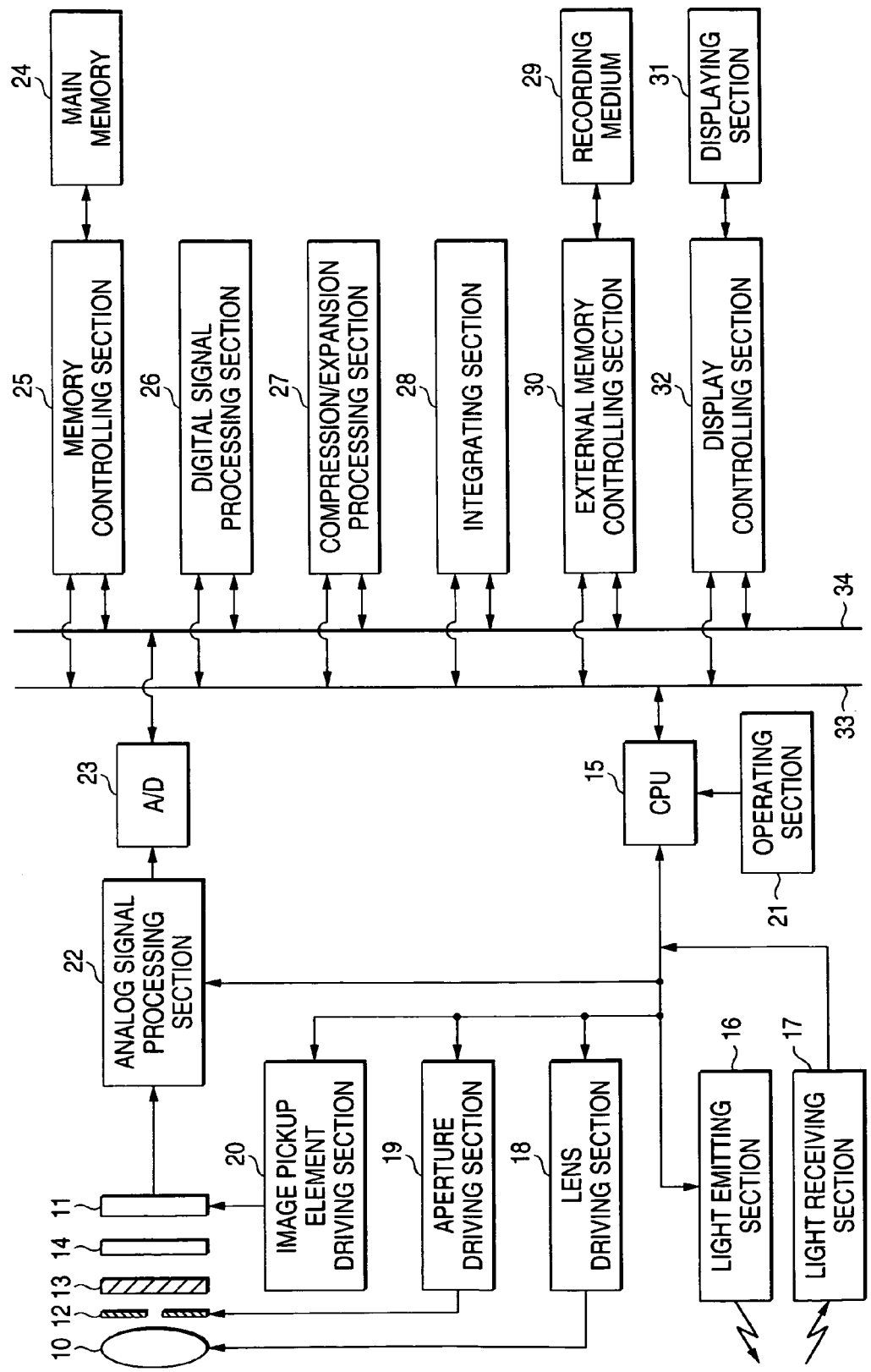
FIG. 1 is a block diagram of a digital still camera of an embodiment of the invention.

FIG. 1 is a diagram of a digital still camera on which a signal processing apparatus of the embodiment of the invention is mounted. Although, in this example, the signal processing apparatus of the embodiment is mounted on a digital still camera, the signal processing apparatus of the embodiment can be similarly mounted on other kinds of digital cameras such as a digital video camera.

The digital still camera shown in FIG. 1 comprises: an imaging lens 10; a solid-state image pickup element 11 such as a CCD; an aperture 12 disposed between them; an IR cut filter 13; and an optical low-pass filter 14. A CPU 15 which controls the whole digital still camera controls a light emitting section 16 for a flash, and a light receiving section 17, controls a lens driving section 18 to adjust the position of the imaging lens 10 to the focus position, and controls the opening amount of the aperture 12 via an aperture driving section 19 to adjust the exposure to an adequate value.

The CPU 15 drives the solid-state image pickup element 11 via an image pickup element driving section 20 so that an object image taken through the imaging lens 10 is output as color signals. An instruction signal from the user is supplied to the CPU 15 via an operating section 21, and the CPU 15 conducts various controls in accordance with the instructions. The solid-state image pickup element 11 is a CCD of the honeycomb pixel arrangement, or a Bayer CCD or CMOS sensor.

An electric control system of the digital still camera comprises an analog signal processing section 22 which is connected to the output of the image pickup element 11, and an A/D converter circuit 23 which converts the RGB color signals output from the analog signal processing section 22, to digital signals. These sections are controlled by the CPU 15.

The electric control system of the digital still camera further comprises: a memory controlling section 25 which is connected to a main memory (frame memory) 24; a digital signal processing section 26 which will be described in detail later; a compression/expansion processing section 27 which compresses a photographed image to a JPEG image and expands a compressed image; an integrating section 28 which integrates photometric data to enable the gain of white balance to be adjusted: an external memory controlling section 30 to which a detachable recording medium 29 is to be connected; and a display controlling section 32 to which a liquid crystal displaying section 31 mounted on, for example, the back face of the camera is connected. These components are connected to one another through a control bus 33 and a data bus 34, and controlled by instructions from the CPU 15.

The components shown in FIG. 1 such as the digital signal processing section 26, the analog signal processing section 22, and the A/D converter circuit 23 may be mounted as discrete circuits on the digital still camera. Alternatively, they and the image pickup element 11 may be formed on the same semiconductor substrate with using an LSI producing technique so as to be produced as one solid-state image pickup device.

Figure 2:
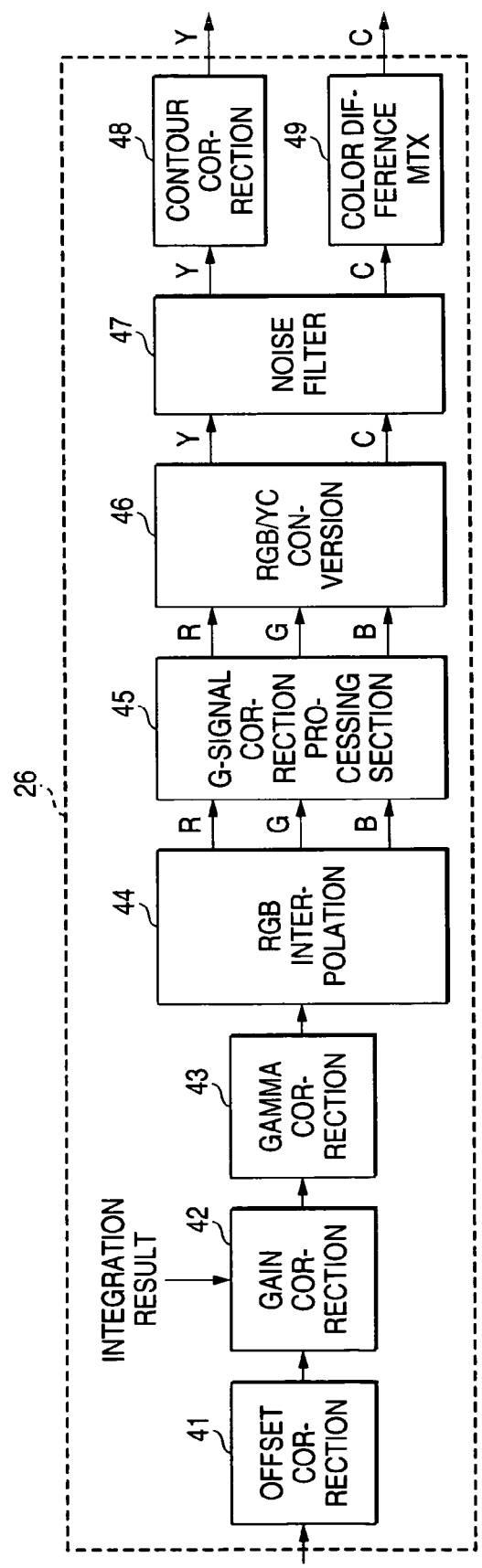
FIG. 2 is a diagram showing in detail the configuration of a signal processing apparatus shown in FIG. 1.

FIG. 2 is a diagram showing in detail the configuration of the digital signal processing section 26 shown in FIG. 1. The digital signal processing section 26 comprises: an offset correcting circuit 41 which fetches digital R, G, and B color signals output from the A/D converter circuit 23, and which performs an offset process; a gain correcting circuit 42 which takes white balance on the basis of a result of the integration of the integrating section 28 (the gain correcting circuit 42 has a function of performing white balance correction on R, G, and B color signals output from the solid-state image pickup element 11.); and a gamma correcting circuit 43 which performs gamma correction on the gain-corrected color signals. In the case where the linear matrix process or the knee correction is to be performed on the offset-corrected signals, the process or the correction is performed between the gain correcting circuit 42 and the gamma correcting circuit 43.

The digital signal processing section 26 further comprises: an RGB interpolation calculating section 44 which performs an interpolation calculation on the gain-corrected R, G, and B color signals to obtain the three color or R, G, and B signals in respective pixel positions; a G-signal correction processing section 45 which fetches the interpolated R, G, and B color signals and performs a signal process that will be described in detail later; an RGB/YC converting circuit 46 which obtains a luminance signal Y and color difference signals Cr, Cb from the R, G, and B color signals output from the G-signal correction processing section 45; a noise filter 47 which reduces the noise levels of the luminance signal Y and the color difference signals Cr, Cb; an contour correcting circuit 48 which performs contour correction on the luminance signal Y after the noise reduction; and a color difference matrix circuit 49 which multiplies the color difference signals Cr, Cb by a color difference matrix to perform hue correction.

In the case of a triple-type image pickup element, the RGB interpolation calculating section 44 is not necessary. However, the solid-state image pickup element 11 used in the embodiment is a single-type image pickup element, and each pixel outputs only one of the R, G, and B color signals. In a pixel which outputs R, therefore, the degrees of the colors which are not output, i.e., G and B color signals in the pixel position are obtained by interpolation of the G and B signals of peripheral pixels.

Figure 3:
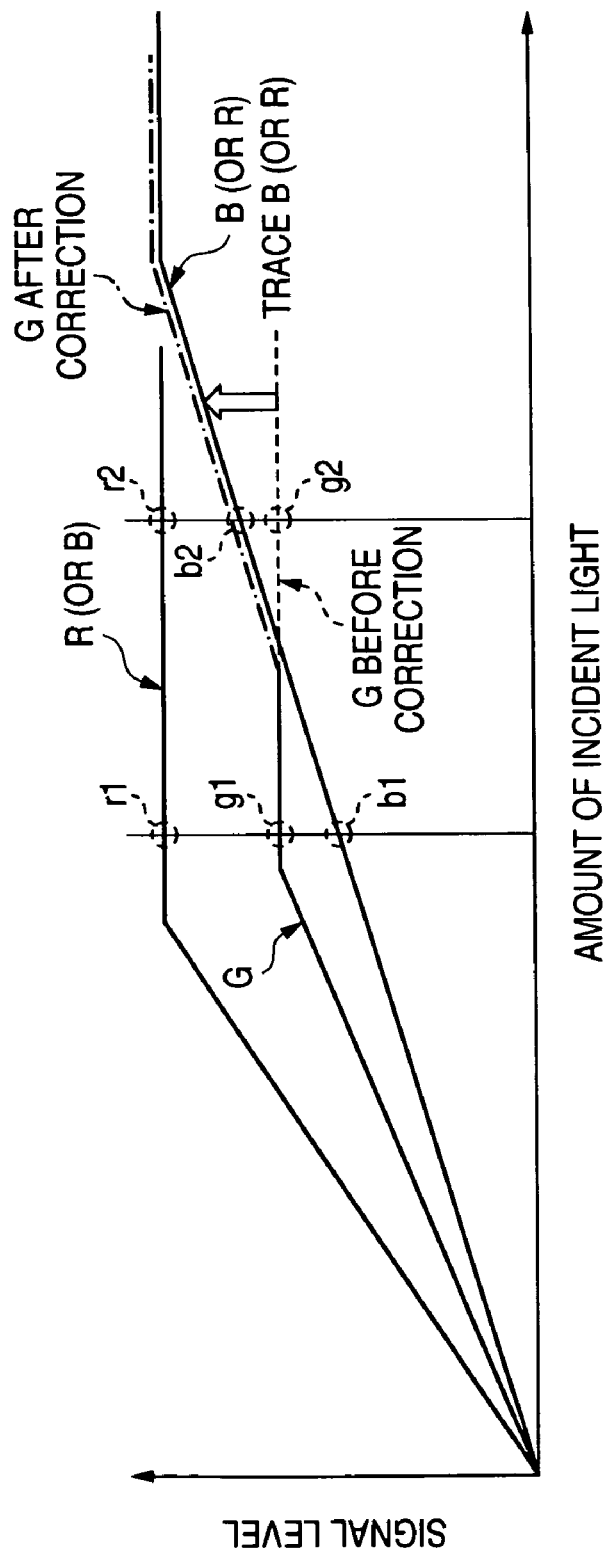
FIG. 3 is a view illustrating the contents of a process performed by a G-signal correction processing section shown in FIG. 2.

FIG. 3 is a view illustrating a G-signal level correcting process performed by the G-signal correction processing section 45 in view of the level relationships of the R, G, and B color signals which are input for each pixel from the RGB interpolation calculating section 44 to the G-signal correction processing section 45.

In the example shown in FIG. 3, the level relationships of R, G, and B are R>G>B (or B>G>R). When the amount of incident light has not yet entered a high brightness region and the above level relationships are established, B signal level b1<G signal level g1<R signal level r1, and an image is not purplish. That is, it is not necessary to correct the signal level g1 of the G signal input to the G-signal; correction processing section 45. Therefore, the G-signal correction processing section 45 outputs the R, G, and B signals which are input from the RGB interpolation calculating section 44, without modification to the RGB/YC converting circuit 46 in the next stage.

When the amount of incident light has entered the high brightness region, and the level of the B signal is raised although the G signal is saturated, to attain G signal level g2<B signal level b2<R signal level r2, an image becomes purplish. Therefore, the G-signal correction processing section 45 raises the G signal level g2, and then outputs the signals to the RGB/YC converting circuit 46. When the G signal level g2 is to be raised, the level is made coincident with a lower one of the B signal level b2 and the R signal level r2. In the illustrated example, the G signal level g2 is made equal to the B signal level b2.

As a result, in the graph showing the relationships between the level of the G signal and the amount of incident light, the level of the G signal and that of the B signal are indicated by the same line in the high brightness region which extends after the G and B signals intersect with each other, as indicated by the one-dot chain line in FIG. 3. Even when both the R signal and the B signal are saturated, R=G=B is attained to achromatize the image, and the image is not made purplish.

The saturation of the G signal can be judged on whether the level of the G signal reaches a predetermined level or not. The predetermined level has a value which is determined depending on the saturation level of the solid-state image pickup element 11, and the white balance process performed in the gain correcting circuit 42 in the preceding stage.

Depending on the imaging scene or the white balance process, the level relationships of the R, G, and B color signals are sometimes different from those shown in FIG. 3. In the case where, when the G signal is saturated, the levels of both the R and B signals are higher than the level of the G signal, the level of the G signal is corrected to coincide with a lower one of the R signal level and the B signal level, whereby the phenomenon that the image is made purplish can be suppressed.

Figure 4:
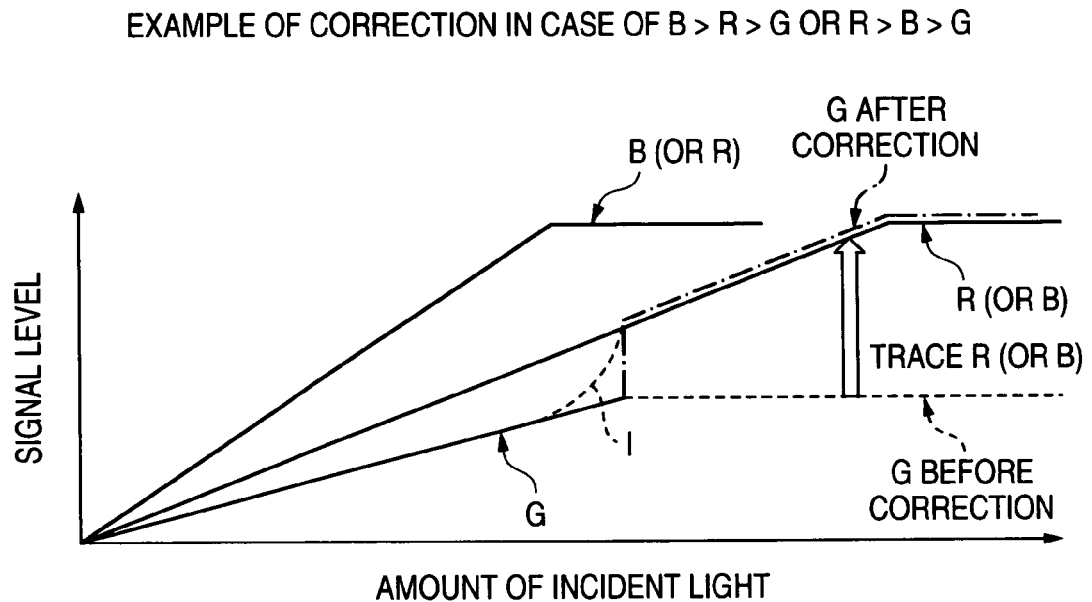
FIG. 4 is a view illustrating the contents of a process performed by the G-signal correction processing section shown in FIG. 2.
Figure 5:
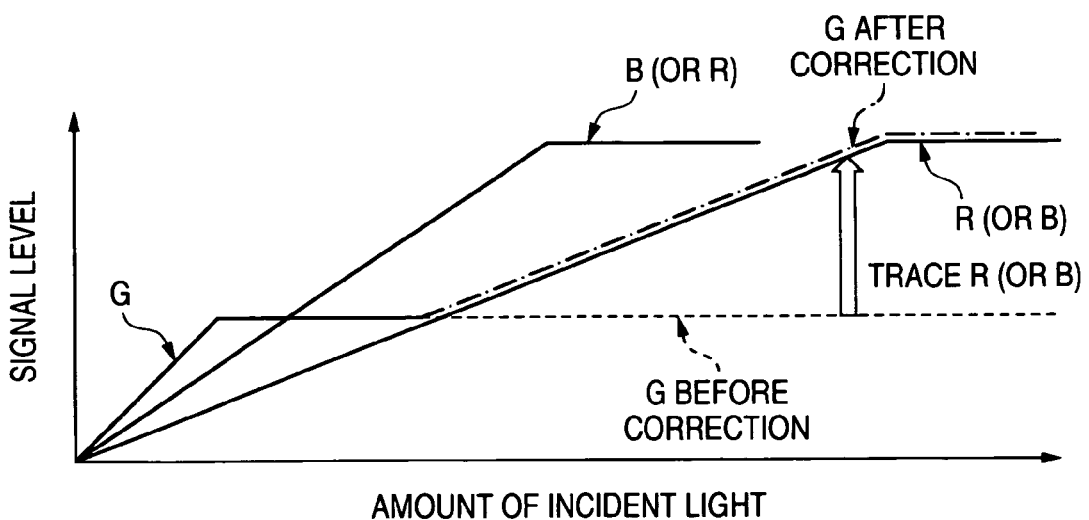
FIG. 5 is a view illustrating the contents of a process performed by the G-signal correction processing section shown in FIG. 2.

FIGS. 4 and 5 are graphs showing G-signal level correcting process in the case where the level relationships of the R, G, and B signals are different from those of FIG. 3. FIG. 4 shows an example of correction in the case of B>R>G (or R>B>G), and FIG. 5 shows that in the case of G>B>R (or G>R>B). In both the examples, the level of the G signal is raised as indicated by the one-dot chain line, and the signals are then output to the RGB/YC converting circuit 46. In this case, when the G signal level is raised perpendicularly in the graph as shown in FIG. 4, an unnatural sense may be produced. Therefore, it is preferable that the G signal level is smoothly changed as indicated by, for example, the broken curve I.

Figure 6:
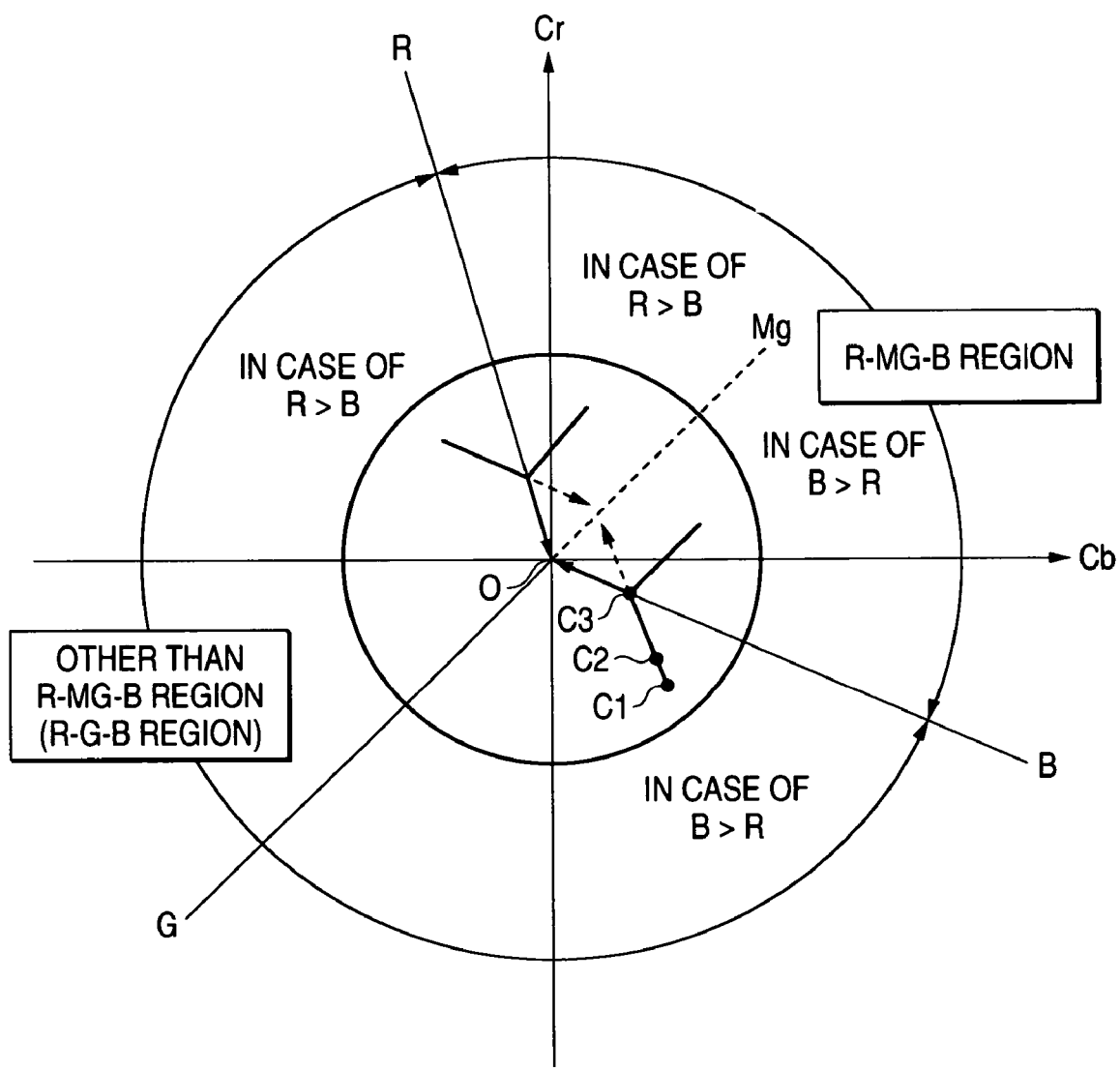
FIG. 6 is a view illustrating the contents of a process performed by the G-signal correction processing section shown in FIG. 2, from the viewpoint of a hue.

As a result, in all the cases, a purple false color in a high brightness region can be corrected to white without reducing the dynamic ranges of red (R) and blue (B). Consideration of this phenomenon from the viewpoint a hue will be described with reference to FIG. 6. A purple false color is conspicuous in the case where the hue is moved into a hue region (R-MG-B region) where the hue is changed from red (R) to blue (B) via purple (magenta MG which is the complementary color of G) from a region other than the hue region (other than the R-MG-B region).

For example, the hue of a pixel signal is changed in the sequence of points c1, c2, . . . . When the G signal is saturated to coincide with the B signal level, the hue reaches point c3. When the G-signal correction process is not performed, the hue of the pixel signal jumps to the line of MG (purple) as indicated by the broken arrow, and the image is made purplish. In the above-described embodiment, after the hue of the pixel signal reaches point c3, the hue is moved along the line of R (>B=G) so that the hue is prevented from jumping to the line of MG as indicated by the broken arrow, and, when all R, G, and B are saturated, the hue reaches the original O (R=G=B, i.e., white). As a result, a purple false color in a high brightness region can be corrected. Also in the case where the G signal is saturated to coincide with the R signal level, a purple false color can be corrected by moving the hue along the line of B (>R=G).

According to the invention, a purple false color that may be generated at high brightness in a region where green (G) is saturated can be suppressed without reducing the dynamic ranges of red and blue.

In the signal processing method and the signal processing apparatus of the invention, generation of a purple false color in a high brightness region can be suppressed. Therefore, they can be beneficially applied to a digital camera.

The entire disclosure of each and every foreign patent application from which the benefit of foreign priority has been claimed in the present application is incorporated herein by reference, as if fully set forth.

What is claimed is:

1. A signal processing method comprising:
   applying white balance correction to R (red), G (green), and B (blue) color signals output from a solid-state image pickup element so as to form white-balance corrected R, G, and B color signals;
   comparing levels of the white-balance corrected R, G, and B color signals with each other;
   correcting the level of the white-balance corrected G color signal to coincide with a lower one of the levels of the white-balance corrected R and B color signals in the case where both of the levels of the white-balance corrected R and B signals are higher than the level of the white-balance corrected G signal when the G color signal is saturated; and
   outputting the white-balance corrected R, G, and B color signals as image signals.

2. A signal processing apparatus which is configured to: apply white balance correction to R (red), G (green), and B (blue) color signals output from a solid-state image pickup element so as to form white-balance corrected R, G, and B color signals; compare levels of the white-balance corrected R, G, and B color signals with each other; correct the level of the white-balance corrected G color signal to coincide with a lower one of the levels of the white-balance corrected R and B color signals in the case where both of the levels of the white-balance corrected R and B color signals are higher than the level of the white-balance corrected G color signal when the G color signal is saturated; and output the white-balance corrected R, G, and B color signals as image signals.

3. A digital camera comprising:
   a solid-state image pickup element;
   a gain correcting section that perform white balance correction on R (red), G (green), and B (blue) color signals output from the solid-state image pickup element; and
   a signal processing apparatus according to claim 2 which fetches R, G, and B color signals that are white balance corrected by the gain correcting section, and which corrects a level of the white-balance corrected G color signal.

4. A digital camera comprising:
   a solid-state image pickup element;
   gain correcting means for performing white balance correction on R (red), G (green), and B (blue) color signals output from the solid-state image pickup element; and
   a signal processing apparatus according to claim 2 which fetches R, G, and B color signals that are white balance corrected by the gain correcting section, and which corrects a level of the white-balance corrected G color signal.

* * * * *